(12) United States Patent
Sawanobori

(10) Patent No.: US 7,477,292 B2
(45) Date of Patent: Jan. 13, 2009

(54) CELLULAR PHONE PROVIDED WITH CAMERA AND RECEPTION INFORMING METHOD

(75) Inventor: Keiji Sawanobori, Tokyo (JP)

(73) Assignee: Hoya Corporation, Tokyo (JP)

( * ) Notice: Subject to any disclaimer, the term of this patent is extended or adjusted under 35 U.S.C. 154(b) by 651 days.

(21) Appl. No.: 11/111,868

(22) Filed: Apr. 22, 2005

(65) Prior Publication Data

US 2005/0237414 A1  Oct. 27, 2005

(30) Foreign Application Priority Data

Apr. 27, 2004  (JP) ............................ P2004-131079

(51) Int. Cl.
- H04N 5/232 (2006.01)
- H04N 5/225 (2006.01)
- H04N 7/00 (2006.01)
- H04B 1/38 (2006.01)

(52) U.S. Cl. ............... 348/211.9; 348/211.2; 348/211.6; 348/375; 348/376; 348/552; 455/567

(58) Field of Classification Search ............... 348/211.2, 348/240.99, 240.1, 240.2, 240.3, 333.01, 348/333.04, 333.05, 373, 374, 375, 552, 348/553, 569, 570; 455/550.1, 556.1, 556.2, 455/557, 560, 561, 563, 566, 567, 575.1
See application file for complete search history.

(56) References Cited

U.S. PATENT DOCUMENTS

| | | | |
|---|---|---|---|
| 6,775,361 B1 | 8/2004 | Arai et al. | |
| 6,950,126 B1 | 9/2005 | Homma et al. | |
| 2003/0117497 A1* | 6/2003 | Nicolaisen et al. | 348/207.99 |
| 2003/0222988 A1 | 12/2003 | Koreki et al. | |
| 2004/0032503 A1* | 2/2004 | Monden et al. | 348/207.99 |
| 2004/0077313 A1* | 4/2004 | Oba et al. | 455/41.2 |
| 2004/0218738 A1 | 11/2004 | Arai et al. | |
| 2005/0088530 A1 | 4/2005 | Homma et al. | |
| 2005/0122423 A1* | 6/2005 | Castaneda et al. | 348/373 |

FOREIGN PATENT DOCUMENTS

| | | |
|---|---|---|
| EP | 0954150 | 11/1999 |
| EP | 1370059 | 12/2003 |
| GB | 2376592 | 12/2002 |

(Continued)

OTHER PUBLICATIONS

English language Abstract of JP 2000-184013.

(Continued)

Primary Examiner—Ngoc-Yen T Vu
Assistant Examiner—Peter Chon
(74) Attorney, Agent, or Firm—Greenblum & Bernstein, P.L.C.

(57) ABSTRACT

A cellular phone provided with a camera that comprises an imaging optical system, a lens barrel, a drive mechanism, and a reception informing processor, is provided. The lens barrel holds the imaging optical system. The drive mechanism drives the lens barrel in order to carry out one of a focusing operation and a zooming operation of the imaging optical system. The reception informing processor informs of a reception of a communication when the reception is detected. The reception informing processor comprises a mechanism to inform of the reception by actuating the lens barrel by using the drive mechanism.

5 Claims, 7 Drawing Sheets

FOREIGN PATENT DOCUMENTS

| | | |
|---|---|---|
| JP | 2000-184013 | 6/2000 |
| JP | 2000-196709 | 7/2000 |
| JP | 2000-217015 A | 8/2000 |
| JP | 2002-305564 A | 10/2002 |
| JP | 2003-315656 A | 11/2003 |
| JP | 2005-283894 A | 10/2005 |
| WO | 2005/057904 | 6/2005 |

OTHER PUBLICATIONS

English language Abstract of JP 2000-196709.
English language Abstract of JP 2005-283894 A.
English language Abstract of JP 2003-315656 A.
English language Abstract of JP 2000-217015 A.
English language Abstract of JP 2002-305564 A.

* cited by examiner

CELLULAR PHONE PROVIDED WITH CAMERA AND RECEPTION INFORMING METHOD

BACKGROUND OF THE INVENTION

1. Field of the Invention

The present invention relates to a cellular phone provided with camera functionality.

2. Description of the Related Art

Some cellular phones are provided with camera functionality as well as phone functionality and mail functionality. This type of cellular phone (camera cell phone) comprises an imaging optical system and an imaging device such as a CCD. An optical image of an object is formed on an imaging surface of the CCD via the imaging optical system. The optical image produced on the imaging surface is subjected to photoelectrical conversion so that image data of the object is obtained.

SUMMARY OF THE INVENTION

For user convenience, the cellular phones are required to be more compact and light weighted. However, it is difficult to miniaturize the size of a cellular phone provided with a camera and reduce the weight thereof, since the CCD, the imaging optical system, and so on, are required to be mounted in addition to the components required for the conventional functionality. Further, there is also the problem of increased manufacturing cost due to the increase in the number of components.

An object of the present invention is to provide a miniaturized and light-weight cellular phone provided with camera functionality.

According to the present invention, a cellular phone provided with a camera is provided that comprises an imaging optical system, a lens barrel, a drive mechanism, and a reception informing processor.

The lens barrel holds the imaging optical system. The drive mechanism drives the lens barrel in order to carry out one of a focusing operation and a zooming operation of the imaging optical system. The reception informing processor informs a user of a reception of communication when the reception is detected. The communication may comprise one of a phone call and e-mail. The reception informing processor comprises a mechanism to inform of the reception by actuating the lens barrel by operating the drive mechanism.

According to another aspect of the present invention, a camera provided cellular phone having an imaging optical system for obtaining an image is provided that comprises first, second, and third reception informing modes.

The first reception informing mode informs of a reception of communication by operating a lens barrel that holds the imaging optical system, the communication comprising a phone call and e-mail. The second reception informing mode informs of the reception by outputting an audible sound. The third reception informing mode informs of the reception by an image indication.

According to another aspect of the present invention, a reception informing method for a camera provided cellular phone is provided. The method comprises steps of detecting a reception of communication, and informing of the reception when the reception is detected by a reciprocating motion of a lens barrel, which holds an imaging optical system, along an optical axis of the imaging optical system.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
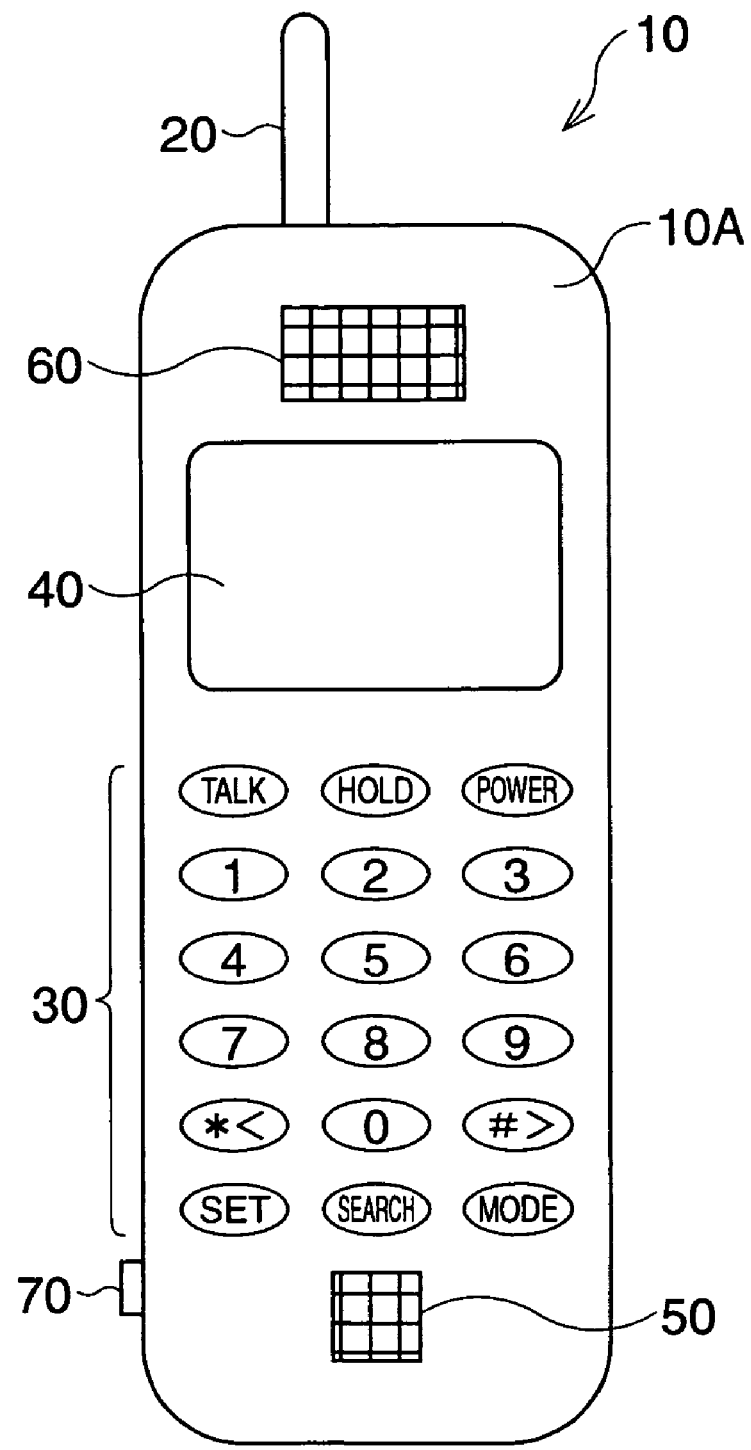
FIG. 1 is a front view of a cellular phone provided with camera functionality (camera cell phone) to which an embodiment of the present invention is applied.

The present invention is described below with reference to the embodiments shown in the drawings.

Figure 2:
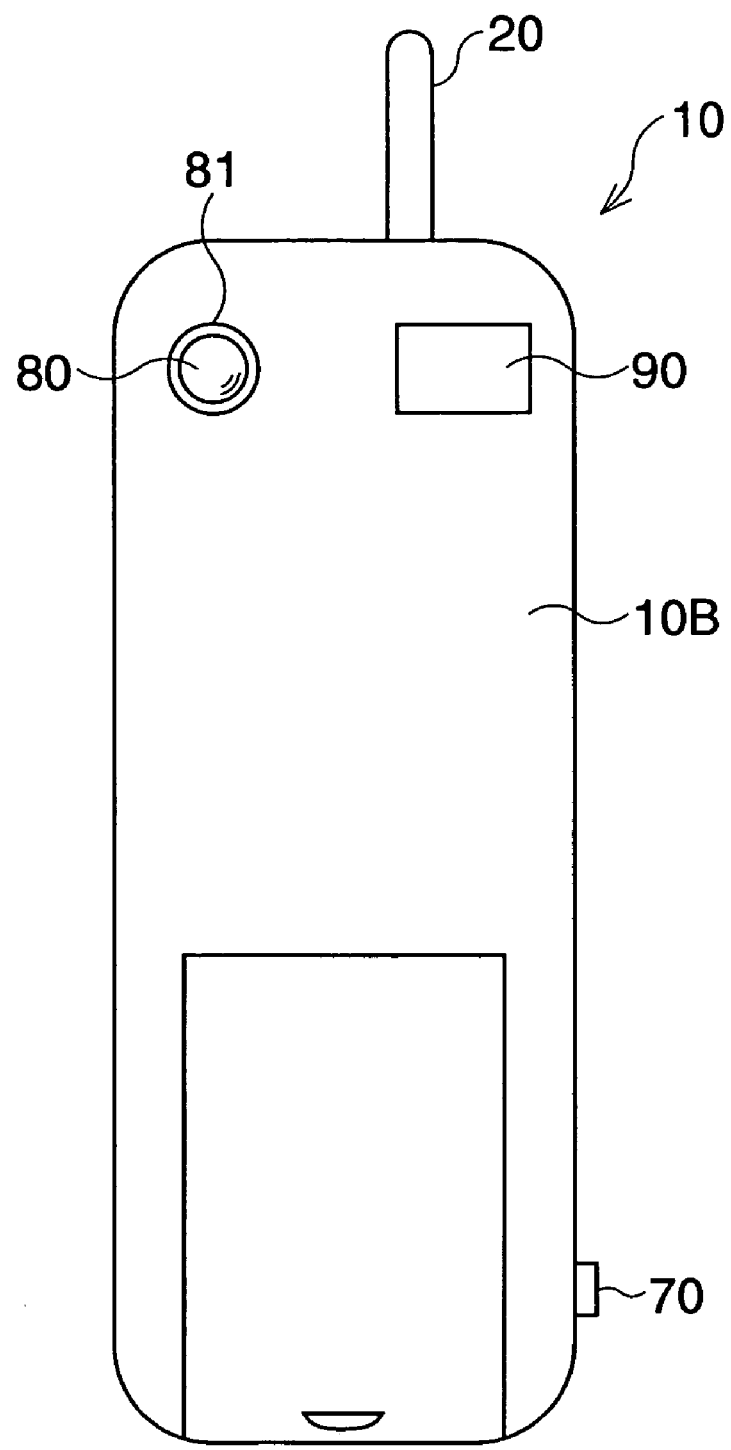
FIG. 2 is a rear view of the camera cell phone shown in FIG. 1.
Figure 3:
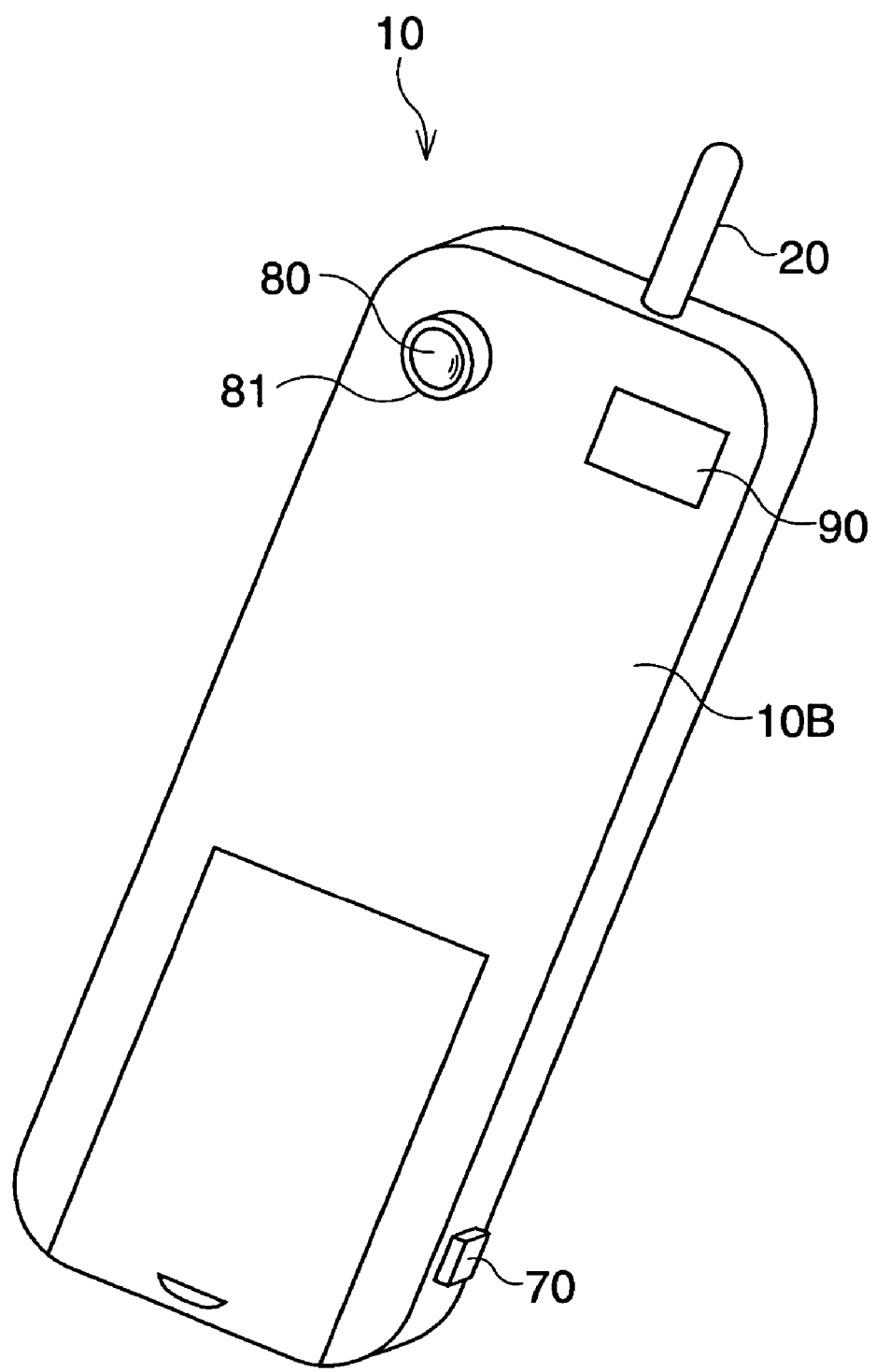
FIG. 3 is a perspective view of the camera cell phone viewed from the rear side.
Figure 4:
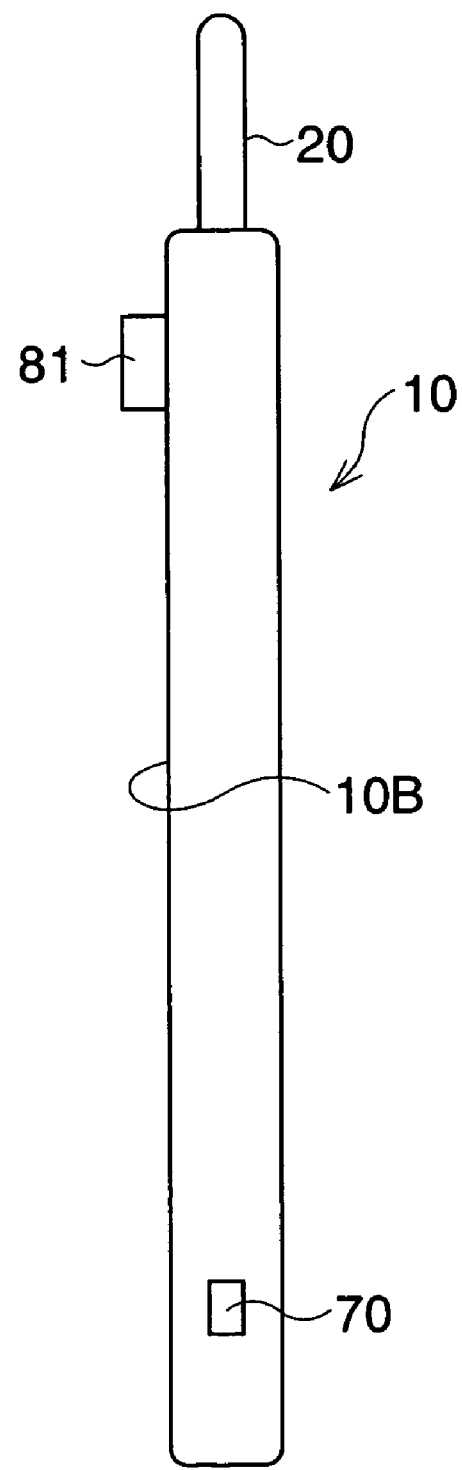
FIG. 4 is a side view of the camera cell phone.

FIG. 1 is a front view of a cellular phone provided with a camera (camera cell phone) to which an embodiment of the present invention is applied. FIG. 2 is a rear view of the camera cell phone shown in FIG. 1. Further, FIG. 3 is a perspective view of the camera cell phone viewed from the rear side and FIG. 4 is a side view of the same.

An antenna 20 is provided on the top of the camera cell phone 10. On the front face 10A of the camera cell phone 10, an operational portion 30 which is provided with a plurality of operational buttons, such as push buttons and so on, is formed. On the upper side of the operational portion 30, a display 40 that is used to indicate various information and images is arranged. On the other hand, on the lower side of the operational portion 30, a microphone 50 or a sound device is disposed. Above the display 40, a speaker 60 is provided. Further, on the side face of the cellular phone 10, an external interface 70 or interface connector which is used to connect to an external device, such as a computer and the like, is provided.

On the rear face 10B of the camera cell phone 10 and at a position close to the upper edge, a lens barrel 80, which holds an imaging optical system 30, and a strobe 90 are provided. The lens barrel 81 is movable along the optical axis of the imaging optical system 80. A focusing operation and a zooming operation of the imaging optical system 80 are carried out by moving the lens barrel 81. FIGS. 3 and 4 illustrate a situation when the lens barrel 81 has moved along the optical axis of the imaging optical system 80 and extends out from the casing of the camera cell phone 10 by a predetermined distance.

Figure 5:
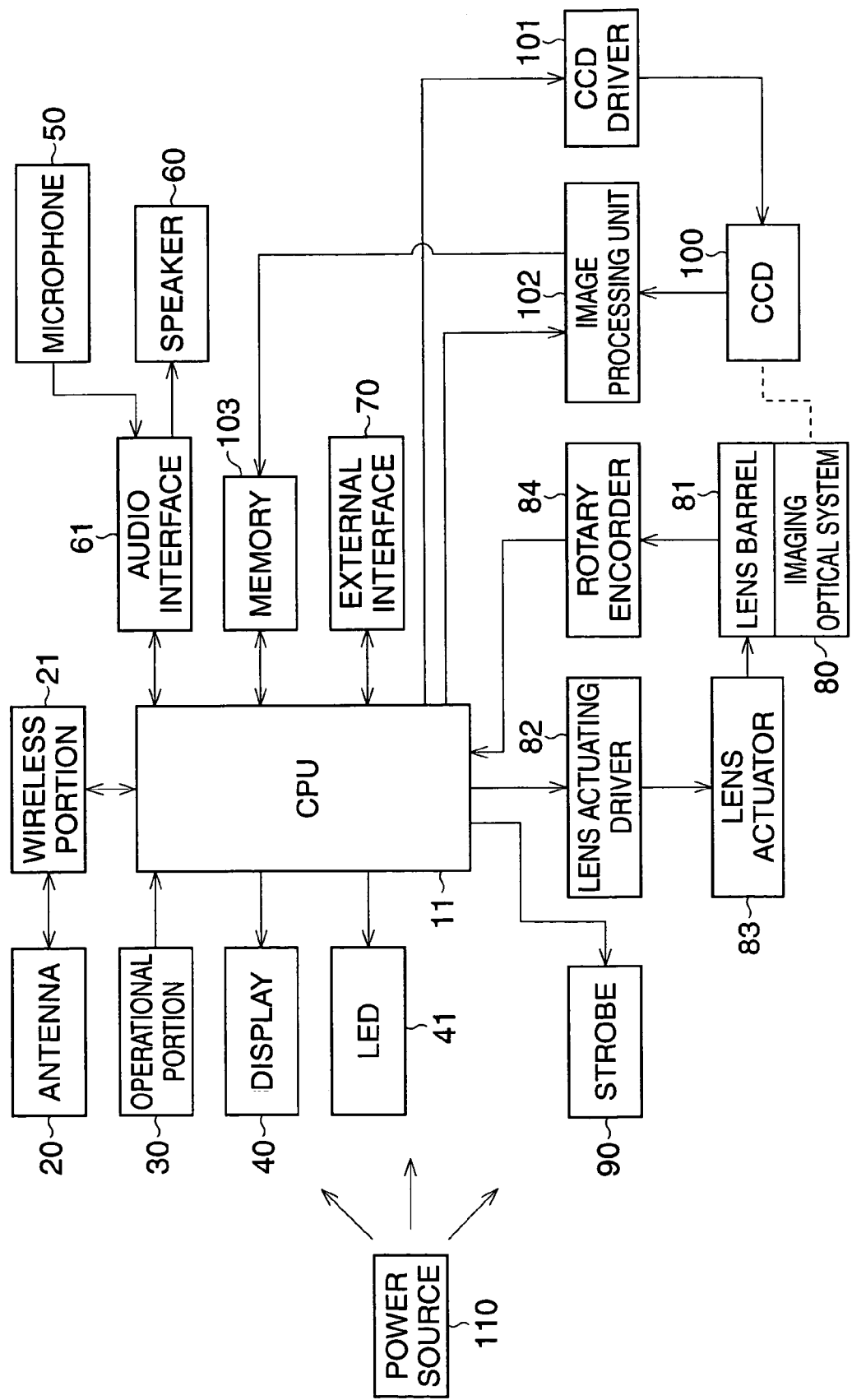
FIG. 5 is a block diagram of the camera cell phone.

FIG. 5 is a block diagram of the camera cell phone 10. A CPU 11 generally controls the camera cell phone 10. When the antenna 20 receives a radio wave, the radio wave is converted to base band signals by a demodulation process at a wireless portion 21. The demodulated base band signals are then input to the CPU 11. The base band signals from the wireless portion 21 are output to an audio interface 61 by the CPU 11. The signals are subjected to a predetermined audio signal processing at the audio interface 61, so that voice or sound is reproduced via the speaker 60.

Voice or sound detected by the microphone 50 is converted to audio signals and subjected to a predetermined audio signal processing at the audio interface 61, and then input to the CPU 11. The data (base band signals) which are processed at the CPU 11 are fed to the wireless portion 21. In the wireless portion 21, a modulation process is carried out in order to emit data from the antenna 20 as radio waves.

When an operational button of the operational portion 30 is operated by a user, a corresponding input signal is input to the CPU 11. In the CPU 11, a process corresponding the input signal is carried out and control signals are suitably output.

An optical image of an object is formed on the imaging surface of the CCD 100 via the imaging optical system 80. When CCD drive signals are output from a CCD driver 101 to the CCD 100, in accordance with the control signals from the CPU 11, the optical image of the object is photo-electrically converted to electrical signals. In turn, analog image signals of the object image are fed from the CCD 11 to an image-processing unit 102. The analog image signals are converted from the analog signals to the digital signals and a predetermined image processing is performed at the image-processing unit 102. The digital image signals that are subjected to the image processing are then stored in a memory 103 as image data.

When lens drive signals are output from a lens-actuating driver 82 to a lens actuator 83 in accordance with the control signals from the CPU 11, the lens actuator, such as a lens drive motor is actuated. The rotation of the lens drive motor is transmitted to a lens barrel 81 through a power transmission mechanism (not shown). As a result, the lens barrel 81 is driven along the optical axis of the imaging optical system 80, so that focusing and zooming operations of the imaging optical system 80 are carried out.

A rotary encoder 84 is provided nearby the lens barrel. Pulse signals according to the movement and the direction of the lens barrel 81 are output from the rotary encoder 84. The pulse signals from the rotary encoder 84 are input to the CPU 11. At the CPU 11, the displacement and the direction of motion of the lens barrel 81 are calculated.

A display 40 is used with a backlight, such as an LED 41. Data that indicates the operational status of the operational portion 30, an image data that is stored in the memory 103, and a message or information to inform a phone call and e-mail reception are suitably indicated on the display 40.

When the illuminance of the object is low, a strobe 90 is driven by a control signal from the CPU 11, so that light is illuminated to the object. Further, transmission and reception of data between an external device and the CPU 11 are carried out through the external interface 70. Note that, the electric power to drive the CPU 11 and each of the above-described portions is supplied from a power source 110.

Figure 6:
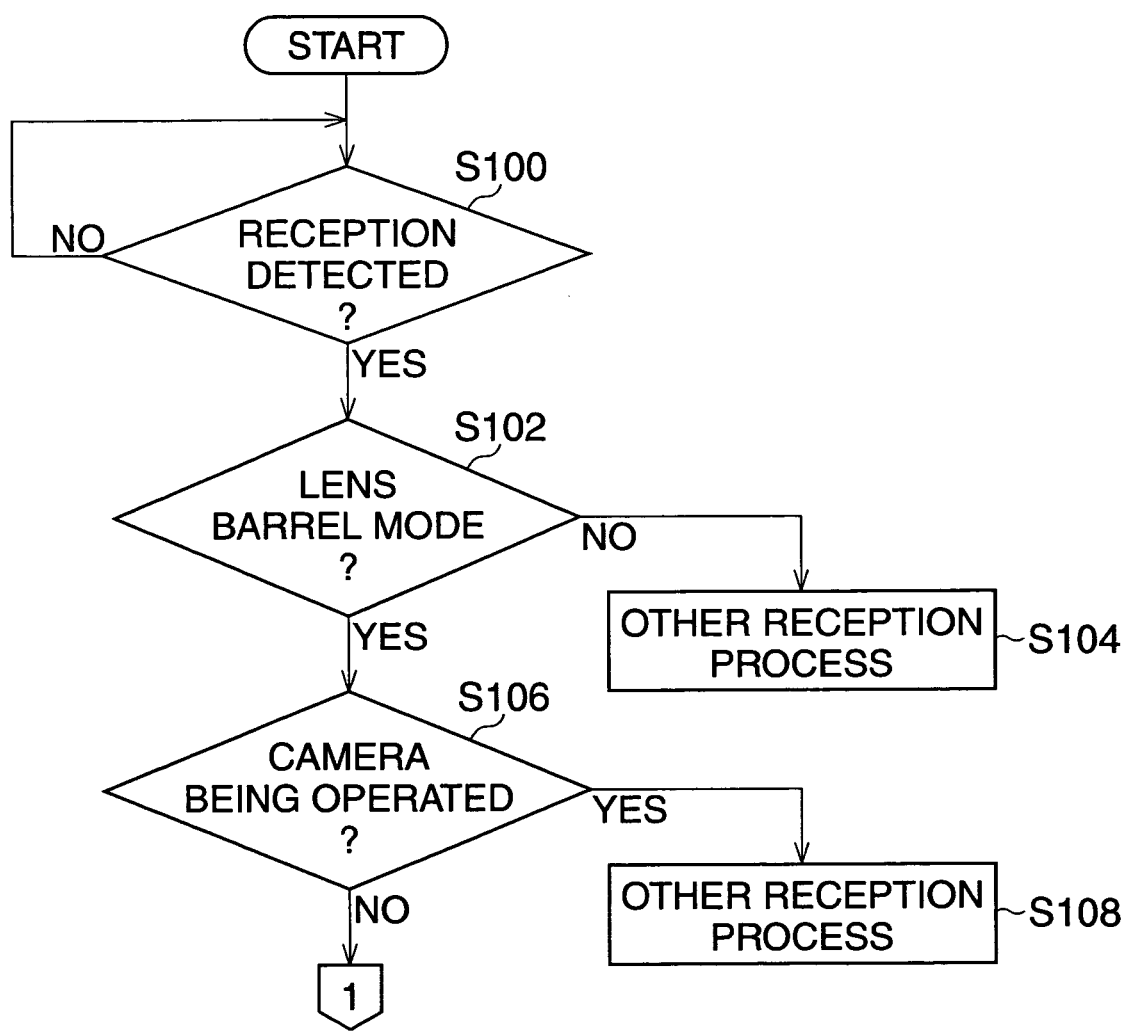
FIGS. 6 and 7 are flow charts that illustrate the processes which are carried out when the phone call or the e-mail is received.
Figure 7:
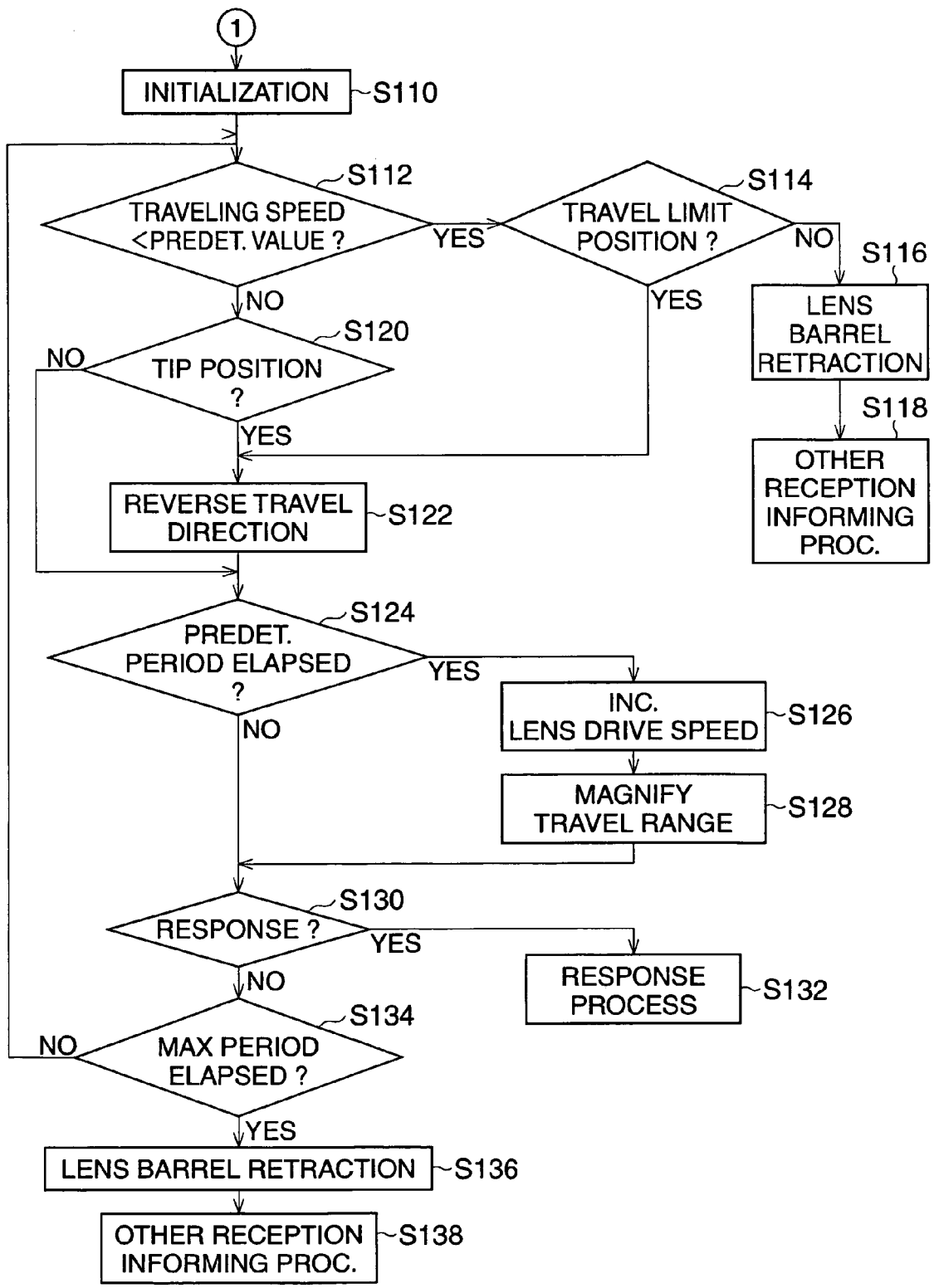

FIGS. 6 and 7 are flow charts that illustrate the processes which are carried out when the phone call or the e-mail is received. In Step S100, an input signal from the wireless portion 21 is checked, and it proceeds to Step S102 when a phone call or an e-mail reception is determined. In Step S102, whether a reception informing mode is set to a lens-barrel mode is determined. In the present embodiment, the reception informing mode has the lens-barrel mode, a voice mode, and image-indicating mode options, which can be selected. The lens-barrel mode is a mode that informs the user of the reception by moving the lens barrel 81 back and forth along the optical axis of the imaging optical system 80. The voice mode is a mode that informs of the reception by outputting an audible sound from the speaker 60. The image-indicating mode is a mode that informs of the reception by indicating a predetermined message on the display 40. The reception informing mode is suitably selected from the above modes and set by the user by operating the operational portion 30. Note that, only one of the above modes can be set as the reception informing mode, but it can also be set as a combination of a plurality of the above modes.

When a mode other than the lens-barrel mode is set as a reception informing mode in Step S102, the process proceeds to Step S104. In Step S104, the informing process for informing of the reception is carried out according to the reception informing mode that has been set.

On the other hand, when it is determined in Step S102 that the lens-barrel mode is set as the reception informing mode, the process proceeds to Step S106. In Step S106, whether the camera function is in operation is checked. Namely, whether the CCD 100 is being driven and the photoelectrical conversion of an optical object image formed via the imaging optical system 80 is being carried out, are confirmed. When the camera function is in use, the image capturing operation will be obstructed if the lens barrel 81 is moved, since the in-focus status of the object image will be disturbed. Therefore, in this case, the lens barrel 81 should not be moved in order to inform of the reception, even when the lens-barrel mode is set. Consequently, when it is determined in Step S106 that the camera function is in use, the process proceeds to Step S108 and the reception is informed to a user by the audio output or the message on the display. Note that, when the voice mode is not selected by the user, the informing operation based on the audio output will not be carried out.

When it is confirmed in Step S106 that the camera functionality is not in operation, the process proceeds to Step S110 of FIG. 7. In Step S110, an initialization process for driving the lens barrel 81 is carried out. In the initialization process, the lens barrel 81 is set at the base position, and a traveling range for the reciprocating motion and the speed are initialized. Further, a timer for counting elapsing time is set.

The base position of the lens barrel 81 is defined as the position where the lens barrel 81 is retracted in the casing of the camera cell phone 10. In the present embodiment, reversible motion of the lens barrel 81 is always based on the above base position. Namely, the travel range of the lens barrel 81 is defined by two boundary positions between which the motion can be reversed; one of the boundary positions is the base position. Note that, in this specification, the other boundary position which defines the travel range of the lens barrel 81 in cooperation with the base position, is referred to as a "tip position". Further, the limits of the travel range of the lens barrel 81, which are defined by the mechanical structure of the driving mechanism of the lens barrel 81, are referred to as "travel limit points". Namely, one of the travel limit points corresponds to the base position and the other corresponds to the maximum position for the lens barrel 81 to extend.

When the above initialization process elapses, the movement of the lens barrel 81 is carried out in accordance with the control of the CPU 11. The CPU 11 monitors the output signals of the rotary encoder 84, so that it calculates the position of the lens barrel 81 and its speed by counting the number of pulse signals. Thereby, the control signals are output to the lens actuating driver 82 so that the lens barrel 81 is reciprocatically moved with in the travel range at a predetermined speed. The lens drive signals are fed to the lens drive motor 83 from the lens actuating driver 82 in accordance with the control signals from the CPU 11, so that the lens drive motor 83 is rotated and in turn the reciprocating motion of the lens barrel 81 is started.

The process then proceeds to Step S112 and the actual speed of the lens barrel 81 is compared with the speed which is currently preset. When it is determined in Step S112 that the actual speed of the lens barrel 81 is slower than the preset speed, the process proceeds to Step S114. In Step S114, whether the lens barrel 81 has reached either of the above travel limit points is checked.

When it is determined that the lens barrel has not reached either of the travel limit points, the process proceeds to Step S116. The situation where the lens barrel 81 has not reached either of the travel limit points, although the speed of the lens barrel 81 is slower than the predetermined speed, happens when the motion of the lens barrel 81 is obstructed for some reason. For example, when the camera cell phone is put in a bag, the above situation may occur when some other things in the bag urges the lens barrel 81 and obstructs the lens barrel 81 from smooth motion. In this situation, the continuation of the reciprocating motion of the lens barrel 81 may induce damage to some members. Thereby, in Step S116, the retraction operation of the lens barrel 81 is carried out, so that the reciprocating motion of the lens barrel 81 is terminated and it is positioned at the base position. The process then proceeds to Step S118 and the informing process for the reception based on the audio output (by the speaker 60) or the image indication (by the display 40) is carried out. On the other hand, when it is determined in Step S114 that the lens barrel 81 has already reached one of the travel limit points, the process proceeds to Step S122.

When it is determined in Step S112 that the actual speed of the lens barrel 81 is not slower than the present preset speed, the process proceeds to Step S120. In Step S120, whether the lens barrel 81 has reached the tip position of the travel range is determined. When it is confirmed that the lens barrel 81 is at the tip position, the process proceeds to Step S122.

In Step S122, a control signal to reverse the travel direction of the lens barrel 81 is output from the CPU 11. As a result, when the lens barrel 81 is at the tip position, the travel direction is reversed to the opposite direction, which is from the tip position to the base position. When the lens barrel 81 is at the base position, the travel direction is reversed to the opposite direction, which is from the base position to the tip position. As described above, in the present embodiment, the processes to reverse the travel direction of the lens barrel 81 are carried out when the lens barrel 81 reaches a travel limit position, or when the lens barrel 81 reaches the tip position while traveling at the preset speed. When the reverse operation of the travel direction is carried out, the process proceeds to Step S124. Note that, when the lens barrel 81 has not reached the tip position at Step S120, the lens barrel 81 is within the predetermined travel range, so that the reverse operation of the travel direction is skipped.

In Step S124, whether the predetermined time has elapsed is checked by using the timer. When the predetermined time has elapsed, the process proceeds to Step S126. In Step S126, the travel speed of the lens barrel 81 is reset to a value faster than the preset value and in turn the travel range of the reciprocating motion is reset to a range larger than the preset range, in Step S128. In other words, the tip position will be reset to a position where the lens barrel 81 extends out beyond the preset position, with respect to the casing of the camera cell phone 10. When the travel speed and the travel range are renewed, the process proceeds to Step S130. On the other hand, when it is determined in Step S124 that the predetermined time has not elapsed, the processes of Step S126 and Step 128 are skipped and the process proceeds to Step S130.

In Step S130, whether a certain response by the user to the reception has been made is checked. The response is monitored by a signal input from the operational portion 30 to the CPU11. When it is determined in Step S130 that the response has been made, the process proceeds to Step S132 and a certain response process is carried out. In this response process, the retraction operation of the lens barrel 81, such that the termination of the reciprocating motion of the lens barrel 81 and the positioning of the base position are carried out.

On the other hand, when a response to the reception has not been detected in Step S130, the process proceeds to Step S134. In Step S134, whether a MAX period has elapsed is checked by the timer. When it is determined that the MAX period has elapsed, the process proceeds to Step S136. In Step S136, the retraction operation of the lens barrel 81 is carried out, the same way in Steps S116 and S132. The process then proceeds to Step S138, so that a message or an icon that informs of the reception is indicated on the display 40. When it is determined in Step S134 that the MAX period has not elapsed, the process returns to Step S112 and the above-described processes are repeated. As described above, the reciprocating motion of the lens barrel 81 repeats until the MAX period elapses. However, when the user does not respond to the reception that is being informed by the reversible motion before the MAX period, the lens barrel 81 is positioned at the base position and its motion is terminated.

As described above, according to the camera cell phone 10 of the present embodiment, the lens barrel 81, which holds the imaging optical system 80, is also used to inform of the reception. Therefore, a particular component to inform of the reception, such as a vibrator, is not required to be provided. As a result, a cellular phone provided with camera functionality is minimized and light weight while providing a reception informing system other than an audio and image output.

Note that, in the present embodiment, the displacement and the direction of the lens barrel 81 movement is detected by the rotary encoder 84, so as to perform a feed back control for the lens drive motor. However, this detection is not limited to this example. A stepping motor can also be applied for the lens actuator and in this case, an open loop control that counts the number of steps can be used.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2004-131079 (filed on Apr. 27, 2004) which is expressly incorporated herein, by reference, in its entirety.

The invention claimed is:

1. A cellular phone provided with a camera, comprising:
an imaging optical system;
a lens barrel that holds said imaging optical system;
a drive mechanism that drives said lens barrel in order to carry out one of a focusing operation and a zooming operation of said imaging optical system; and
a reception informing processor that informs a user of a reception of a communication when the reception is detected;
wherein said reception informing processor comprises a mechanism to inform of the reception by actuating said lens barrel by using said drive mechanism;
wherein said reception informing processor controls said drive mechanism so that said lens barrel repeats a reversible motion along an optical axis of said imaging optical system when detecting a reception is detected; and
wherein said reception informing processor gradually increases a travel range of said lens barrel and a travel speed, when a predetermined period of time has passed after the reception.

2. A cellular phone provided with a camera according to claim 1, wherein said reception informing processor prohibits the operation of said lens barrel when an imaging device, in which an optical image of an object is formed by said imaging optical system, is driven and when the reception is detected.

3. A cellular phone provided with a camera according to claim 2, wherein said reception informing processor indicates a fact that the reception has been detected, on a display.

4. A cellular phone provided with a camera according to claim 2, wherein said reception informing processor informs of a reception, by outputting an audible sound.

5. A reception informing method for a cellular phone provided with a camera, comprising:
- a first step in which a reception of a communication is detected; and
- a second step in which when the reception is detected, the reception is indicated by a reversible motion of a lens barrel that holds an imaging optical system, along an optical axis of said imaging optical system;

wherein said second step further comprises:
- a third step that reverses a travel direction of said lens barrel when said lens barrel has reached a boundary position of said lens barrel travel range;
- a fourth step that increases a travel speed of said lens barrel when a predetermined period has elapsed; and
- a fifth step that magnifies a travel range of the reciprocating motion of said lens barrel when the predetermined period has elapsed.

* * * * *